United States Patent Office 3,043,882
Patented July 10, 1962

3,043,882
MANUFACTURE OF RESORCINOL
Bernard Hammond Markham Thompson, Lower Kingswood, England, assignor, by mesne assignments, to Hercules Powder Company, a corporation of Delaware
No Drawing. Filed Aug. 5, 1959, Ser. No. 831,733
Claims priority, application Great Britain Aug. 8, 1958
3 Claims. (Cl. 260—621)

The present invention relates to the manufacture of dihydric phenols and in particular to the recovery and isolation of resorcinol prepared by the cleavage of meta-diisopropylbenzene dihydroperoxide.

Resorcinol may be prepared by the oxidation of meta-diisopropylbenzene to give an oxidate containing meta-diisopropylbenzene dihydroperoxide from which the dihydroperoxide may be separated, for instance by extraction with alkali, and subsequently catalytically cleaved to give a reaction product containing resorcinol. Alternatively the oxidate may be subjected to catalytic cleavage of the hydroperoxide contained in it without separation. Such cleavage reaction products contain material less volatile than resorcinol, which probably comprises a high boiling condensation product of resorcinol with meta-isopropenyl phenol, and this material may be thermally decomposed in the presence of steam while simultaneously distilling off the additional quantities of resorcinol and the meta-isopropenyl phenol so formed, and the resorcinol and meta-isopropenyl phenol may be recovered from the aqueous distillate. During recovery the meta-isopropenyl phenol shows a marked tendency to recombine with the resorcinol in the distillate, thereby decreasing the yield of resorcinol and making it difficult or impossible to recover pure resorcinol by fractional distillation of the aqueous distillate.

According to the present invention the process for the manufacture of resorcinol by the catalytic cleavage of a reaction mixture containing meta-diisopropylbenzene dihydroperoxide derived from the oxidation of meta-diisopropylbenzene, comprises heat decomposing the material less volatile than resorcinol while passing steam through said material, simultaneously distilling off the additional quantities of resorcinol and the meta-isopropenyl phenol so formed, and recovering the resorcinol from the aqueous distillate while maintaining the pH of the latter at a value of at least 4.

The discovery upon which the process of the present invention is based is that by maintaining the pH of the distillate obtained from the thermal decomposition step at a value of at least pH 4 and preferably between pH 4 and pH 7 during its condensation and the subsequent processing of the distillate for the recovery of the resorcinol, the tendency of the resorcinol and the meta-isopropenyl phenol to combine together in the aqueous distillate to form high boiling by-products is reduced.

The reaction product resulting from the catalytic cleavage of a reaction mixture containing meta-diisopropylbenzene dihydroperoxide contains, in addition to resorcinol and material less volatile than resorcinol, acetone, the cleavage catalyst and possibly unchanged hydrocarbon and other materials. This product, before being processed according to the present invention, is preferably first treated to remove or substantially neutralise the catalyst and stripped of low boiling materials such as acetone and unchanged hydrocarbons. Then the heat-treatment may be carried out after removal, for instance by distillation, of some of the free resorcinol, or the heat-treatment may be carried out concurrently with the distillation of the cleavage reaction product without prior removal of any of the free resorcinol.

In a preferred embodiment of the process of the present invention, in which an acid such as sulphuric acid is used as the cleavage catalyst, the cleavage reaction product is treated to remove the catalyst by contacting it with about 30% aqueous ammonium sulphate, whereby the acid is extracted into the aqueous phase, to bring the pH of the cleavage reaction product (measured by mixing with an equal volume of water and determining the pH of the aqueous phase) to about 3. Small amounts of ammonium sulphate remain in the cleavage reaction product which is then distilled, to remove low boiling materials such as acetone and hydrocarbons, to obtain an aqueous solution of resorcinol containing material less volatile than resorcinol and traces of ammonium sulphate. This aqueous solution of resorcinol is used as the preferred starting material for the process of the present invention, and during the heat-treatment in the presence of steam small amounts of ammonia are evolved by dissociation of the ammonium sulphate, and pass over into the distillate, where they serve to maintain the pH at a value of at least 4.

Alternatively, the pH of the distillate from the heat-treatment step may be maintained at a value of at least pH 4, and preferably between pH 4 and 7, by feeding small amounts of ammonium sulphate or a volatile base such as ammonia or an organic amine into the feed to the heat-treatment, or by adjusting the pH of the aqueous distillate directly by the addition of an alkali, preferably ammonia. The presence of a volatile base such as ammonia in the feed to the heat-treatment ensures that all points where meta-isopropenyl phenol and resorcinol condense the acidity will be at a minimum and hence recombination reduced. In addition the dimerisation of meta-isopropenyl phenol is reduced, and the monomer, a potentially valuable by-product, can be recovered in increased yield.

The use of ammonium sulphate to control the pH of the distillate from the heat treatment step is unique in that when it is added to or is present in the feed to the heat treatment, it decomposes to give sulphuric acid and ammonia. The latter increases the pH in the column and in the distillate, and the sulphuric acid remains in the bottoms and catalyzes the decomposition of the material which is less volatile than resorcinol.

The decomposition by the action of heat of the material contained in the cleavage reaction product which is less volatile than resorcinol while passing steam through said material may be carried out over a moderately wide temperature range, for instance at temperatures in the liquid mixture between 170° and 400° C. No advantage is gained by operating at temperatures above 300° C., and a preferred temperature range is between about 200° and 270° C. Lower or higher temperatures may be used if desired, but at tempertures below 200° C. the decomposition of the material less volatile than resorcinol takes place slowly and may not proceed to completion, while at temperatures in the region of 400° C. and above coke deposition is likely to occur.

In the process of the present invention, it is preferred to use superheated steam, the steam being passed through the material being treated in such a volume that the resulting vapour phase when condensed forms a 20 to 40% aqueous solution of resorcinol. The steam is desirably introduced at a temperature of the order used for the thermal decomposition. Thus, it may be introduced at a temperature in the order of 170 to 300° C., or alternatively at 100° C., in which case it will be instantaneously superheated by the vessel contents.

The thermal decomposition may be carried out at any convenient pressure, and atmospheric pressure or slightly less than atmospheric pressure is preferred. The operation may be conveniently carried out in the kettle of the still used for fractionating the product of the cleavage reaction. For instance, after low boiling materials have been removed, the pressure may be reduced and a fraction containing resorcinol collected. Then, when part of the free resorcinol has been removed, steam is passed in and the kettle temperature is allowed to rise until cracking of the material less volatile than resorcinol takes place, whereby meta-isopropenyl phenol and additional quantities of resorcinol are produced and at once are carried off by the steam. Alternatively, the steam may be passed in throughout the whole operation. If the whole distillation is carried out at increased pressures, the thermal decomposition may precede the collection of any resorcinol, and a fraction comprising meta-isopropenyl phenol and resorcinol collected.

The recovery of the resorcinol from the aqueous distillate, which also contains meta-isopropenyl phenol, while the pH of the aqueous distillate is maintained at a value of at least 4, may be carried out in any suitable manner, for instance by distillation or solvent extraction methods.

For instance, the meta-isopropenyl phenol may be separated from the resorcinol by extraction with benzene, toluene, α- or β-methylnaphthalene or mixtures thereof, chloroform or carbon tetrachloride. In one method the vapour phase is passed into such a solvent directly, in which case two layers will form—an aqueous solution of resorcinol and a solvent solution of meta-isopropenyl phenol. The aqueous phase containing the resorcinol is advantageously redistilled or sublimed to recover the pure material.

The following comparative example is given further to illustrate the process of the present invention.

*Example*

Crude aqueous resorcinol obtained from the acid cleavage of meta-diisopropylbenzene dihydroperoxide by neutralisation and distillation of acetone contained approximately 41% resorcinol, 29% by-products and 30% water. This crude aqueous solution (pH 2.2) was subjected to a heat-treatment and stripped with superheated steam, the hot vapours being quenched in a water-jacketed condenser. The condensate (pH 2.8), consisting of an upper oily phase and a lower aqueous resorcinol phase, was treated to remove the oily by-product and the aqueous resorcinol dehydrated and distilled. The distilled resorcinol was 96% w./w. pure and the residue amounted to 3.1% of the charge to the distillation.

The by-products which had been separated from the aqueous resorcinol were distilled. Only 22% of the charge distilled below 140° C. at 13 mm. Hg pressure, the remainder being a high-boiling resinous residue. This indicated that a considerable proportion of the meta-isopropenyl phenol present in the by-products had resinified.

By way of contrast some of the crude aqueous resorcinol having the composition given above was neutralised to pH 3.9 with aqueous ammonia before the heat-treatment and steam stripping with superheated steam. The condensate from the quench condenser which consisted of an upper oily phase and a lower aqueous resorcinol phase (pH 4.9) was treated to remove oily by-products and the resultant aqueous resorcinol dehydrated and distilled. The distilled resorcinol was 97% w./w. pure and the distillation residue was only 2.4% of the charge.

The by-products which had been separated from the aqueous resorcinol were distilled at 13 mm. Hg pressure. Approximately 78% of the charge distilled below 140° C. indicating that most of the meta-isopropenyl phenol was recovered as the monomer.

I claim:

1. In the process for the production of resorcinol wherein (1) a reaction mixture derived from the oxidation of meta-diisopropylbenzene and containing meta-diisopropylbenzene dihydroperoxide is subjected to acid cleavage to produce resorcinol and material less volatile than resorcinol, (2) the material less volatile than resorcinol is heat decomposed while passing steam through said material, (3) the additional quantities of resorcinol and meta-isopropenyl phenol so formed are simultaneously distilled off, and (4) the resorcinol is recovered from the aqueous distillate, the improvement of maintaining the pH of the aqueous distillate at a value between 4 and 7 by carrying out the heat decomposition of the material less volatile than resorcinol in the presence of ammonium sulfate.

2. The process of claim 1 wherein the material less volatile than resorcinol is heat decomposed at a temperature between 170° and 400° C.

3. The process of claim 1 wherein the ammonium sulfate is provided by feeding small amounts of ammonium sulfate into that component of the feed to the heat decomposition step which contains the material less volatile than resorcinol.

References Cited in the file of this patent

UNITED STATES PATENTS

| | | |
|---|---|---|
| 2,668,859 | Scriabine | Feb. 9, 1954 |
| 2,714,120 | Kehe | July 26, 1955 |

FOREIGN PATENTS

| | | |
|---|---|---|
| 775,813 | Great Britain | May 29, 1957 |